P. P. STEWART.

Coal Stove.

No. 2,023. Reissued July 4, 1865.

Witnesses
Marcus P. Norton
Charles D. Kettum

Inventor.
Philo P. Stewart.

N. PETERS, Photo-Lithographer, Washington, D. C.

UNITED STATES PATENT OFFICE.

PHILO P. STEWART, OF TROY, NEW YORK.

COAL-STOVE.

Specification forming part of Letters Patent No. 38,361, dated April 28, 1863; Reissue No. 2,023, dated July 4, 1865.

*To all to whom it may concern:*

Be it known that I, PHILO P. STEWART, of the city of Troy, county of Rensselaer, and State of New York, have invented certain new and useful Improvements in Coal-Burning Stoves, upon which Letters Patent of the United States were granted and issued to me, bearing date the 28th day of April, A. D. 1863, which Letters Patent are now surrendered for the purpose of a reissue of the same upon the following specification, which I do hereby declare to be a full and exact description of the construction and operation of my said invention and improvements, reference being hereby had to the accompanying drawings, making a part of this specification.

Like letters represent and refer to like or corresponding parts.

Figure 1:
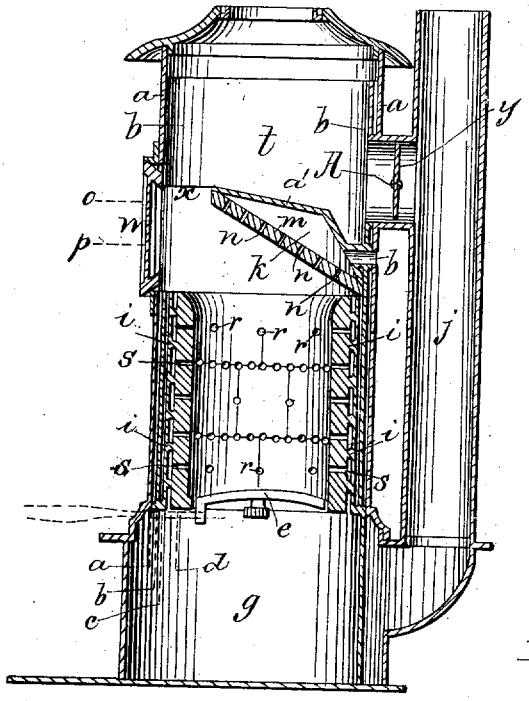
Figure 2:
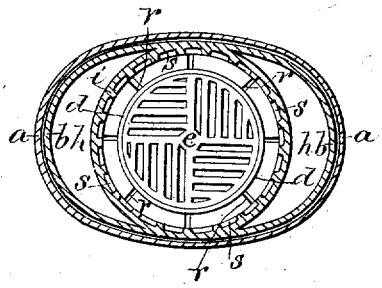
Figure 4:
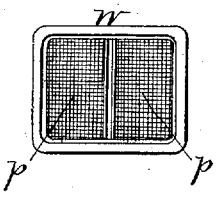
Figure 3:
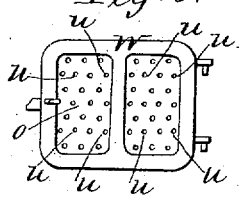

Figure 1 is a vertical section taken through the center of said stove from the front door to the exit-pipe and showing the invention and improvements hereinafter more fully described and set forth. Fig. 2 is a transverse or cross section through the fire-chamber just above the fire-grate of my said stove, and showing the fire-brick and iron cylinder surrounding said fire-brick, and the air-chamber between said fire-brick and said iron surrounding cylinder, and each more fully hereinafter described and set forth. Fig. 3 shows the outside of the door, hereinafter described, and made of mica or of any material substantially the same, and perforated in the manner substantially as herein provided. Fig. 4, shows the inside of the door referred to in Fig. 4 and is that part of said door known as the "wire-gauze," each of which are arranged and combined in an iron door-frame in the manner substantially as and for the purposes hereinafter described and set forth.

The nature of my said invention and improvements consists in the construction and arrangement of the cylinder of the fire-chamber with an annular air-distributing chamber between the fire-brick which form the inside of the said fire chamber, which may be of any form or shape desirable, and the said surrounding cylinder which forms the outside part of the said fire chamber or cylinder and which of course will in form or shape conform to that of the said fire-brick forming the inside of the fire-chamber as aforesaid. The said annular air-distributing chamber communicates with the said fire-chamber or chamber of combustion by means of apertures through or between the joints or joining of the said fire brick in the making up and completion of the combustion-chamber, so as to admit atmospheric air from said annular air-distributing chamber into the said fire-chamber at, around, and upon the sides of the incandescent coals, in the manner substantially as hereinafter described and set forth.

It also consists in the construction of the iron cylinder or box surrounding the said air-distributing chamber with lugs, flanges, or points of iron cast with and upon the inside of such cylinder or box, for the purpose of receiving the said fire-brick against the inner end of such lugs or points, so as to make or form the said annular air-distributing chamber in the manner substantially as herein described and set forth.

It also consists in the arrangement of an air distributing chamber projecting somewhat over the fire chamber or chamber of combustion, and containing apertures, in combination with cold-air chambers or chamber in the front door opposite thereto, so as to cause the non-consumed or escaping gases or other combustible material arising from said chamber of combustion below to ignite by means thereof, substantially as herein described and set forth.

It also consists in the employment of wire-gauze in the said front door in one or more panels, in combination with the air-distributing chamber surrounding the fire-box or chamber of combustion and communicating therewith by means of apertures, as aforesaid and as hereinafter described and set forth, so that when the damper opening into the ash-chamber below is closed and the atmospheric air entering therein and passing up into the said annular or surrounding air-distributing chamber and thence into the sides of the fire through the aforesaid aperatures, as well as through the said fire-grate, is shut off and therefrom in part or in whole, then the atmospheric air passing through the said wire-gauze shall be more strongly drawn downward into and among the evolving gases and smoke from the burning fuel below in such manner as to cause and continue the combustion of said gases or smoke so arising above the said fuel by means thereof.

To enable others skilled in the art to which my said invention and improvements relate, I will here proceed to describe the construction and operation thereof, which is as follows, to wit:

I construct the outside cylinder or box, *c*, Figs. 1 and 2, of cast iron and of any size, height, or thickness required. On the inside of this cylinder or box I cast the projections or iron points *i*, Figs. 1 and 2, which are of any required number or size desired to answer the required purpose. These projections may be of any length deemed best for the thickness of said air-distributing chamber and may be upon any part of the said cylinder or box which will best answer the purpose, which is for supporting the said inner lining or fire-brick *d*, which contain apertures through which the air in the surrounding air-chamber is admitted to the sides of the fire. The said iron cylinder or box having the lugs, iron points, or projections upon the inside, as aforesaid, together with the inner lining or fire brick, *d*, when put together as shown in the said drawings, form and complete the surrounding air-distributing chamber *s*, Figs. 1 and 2, which said chamber is for the circulation of air admitted thereto from the lower part or end thereof, and which opens directly into the ash-pan or ash-chamber *g*, Fig. 1, and which chamber *s* extends the whole height of the fire chamber. The air entering the said chamber *s* circulates throughout the same, preventing any undue action upon or destruction of the said inner linings or fire-brick by reason of the fire in the said fire-chamber, and thereafter enters into the fire in the fire chamber upon the sides thereof through and by means of the apertures *r* in the said inner linings or fire-brick, *d*, Figs. 1 and 2, which aids combustion of the fuel, as well as the consumption of the gases and smoke evolved from the burning fuel. The size and capacity of the said air-distributing chamber *s* will depend upon the length of the said iron points or projections *i*, Figs. 1 and 2. The said inner lining or fire-brick, *d*, may be made up in sections or tiers, as shown at Fig. 1. Each tier of said fire brick, *d*, is supported and retained in proper position by means of the said iron points or projections *i*, which may be at or near the top and bottom edge of each such tier, while between the joints or joining of each tier thereof I construct in some suitable manner the said apertures *r*, as seen at Fig. 1, which may be of any size or number deemed best, as aforesaid. The atmospheric air entering the said chamber *s* at the lower end thereof, as aforesaid, is continually entering the said fire-chamber and into the incandescent coals and among the gases and smoke therein at different points around the same through the said apertures *i*. The said fire-chamber or chamber of combustion may be round, oval, square, or in form of a parallelogram, or any other form or shape deemed best. My said improvement may be applied to either form or shape without changing the character of the invention.

Above the said chamber of combustion and upon the rear part thereof, and also above the said air-distributing chamber *s*, I construct a cold-air chamber, and seen at *k*, Fig. 1, which has a cast-iron perforated plate, *m*, projecting somewhat forward into the radiating-chamber *t*, and may be upon any angle or inclination desired. Through the said plate *m*, I construct the apertures *n*, which communicate from the said air-chamber *k* to the chamber below. Cold atmospheric air enters said chamber *k* through and by means of the tube or opening *e*, which opens into the room where the said stove is used and which tube may be of any size, shape, or capacity desired. The upper plate, *a'*, by which the said chamber is completed, may be of any form or shape deemed best. It is securely fastened to the said plate below. The said lower plate, *m*, may be of any desired shape upon its lower face. This chamber may extend upward and project forward into the said space or radiating chamber above the combustion-chamber to any point or angle which may be found convenient or necessary. The said air chamber *k* may be formed by a continuation of the said air-distributing chamber around the fire-chamber or box below, which, of course, may be brought forward to any distance or angle from and above the top of the said chamber of combustion. That part of the plate so inclining forward and above the said fire box or chamber may contain as many apertures as may be deemed best for the purposes hereinbefore described, and then the said upper part or chamber may be supplied with atmospheric air, as aforesaid.

When the said chamber is made separate from the chamber around the fire box or chamber, its lower part will of course rest upon the immediate top of the said fire chamber or box, while the said lower plate, *m*, may be supported by any suitable means or in some substantial manner.

*x*, Fig. 1, shows a plate, upon which one end of the said air-chamber rests or is supported. This chamber *k* will always be directly opposite to the said door *w*, as aforesaid. Between the said chamber *k* and the said door *w* there is a space or throat of any size or capacity for the successful working or operation of the draft, communicating direct or by circuit with the exit-pipe *j*, as well as to allow the escape of non-consumed products of combustion into the said exit-pipe, as well as full and free circulation of heat into the radiating-chamber. In a stove having a fire-chamber with four sides the said air-chamber *k* may only extend across and over the back or rear part of such fire-chamber. The said door *w* with wire-gauze would in that case extend along the full length of the same and in the front of said stove. Such door might therein contain one or more panels of the said wire-gauze or of mica and wire-gauze combined, substantially as hereinafter provided.

The said front door, *w*, is constructed with an air-chamber, Fig. 1. This chamber is formed by means of the perforated mica *o*, Fig. 3, and the wire-gauze *p*, Figs. 1 and 4. The said mica is upon the front or outside of said door, while the said wire-gauze is on the opposite or inside, and each are properly held in their respective places. The said mica *o*, Figs. 1 and 3, has small apertures, *u*, as seen at Fig. 3, through which atmospheric air is admitted into the said intervening chamber *z*, Fig. 1, and thence through the said wire-gauze *p*, Figs. 1 and 4, and then coming in contact with the atmospheric air, which enters the said fire-chamber through the said perforated plate *m* from the said chamber *k*, and also with the heat arising from the fire-chamber below, by means of the atmospheric air entering such fire in said fire chamber or box from the said surrounding air-distributing chamber *s*, and through the fire-grate, the evolving gases and smoke arising from the burning fuel below are arrested and thereby caused to ignite and burn, which, in combination with the said gas and smoke burning arrangement surrounding the fire box or chamber in the manner aforesaid, constitute a very perfect gas and smoke burning stove or device. The said door *w* is contained in the outer cylinder or plate, *a*, as shown at Fig. 1, and is, as aforesaid, directly opposite the said air-chamber *k*, or any chamber substantially the same. In the use of the said door *w* the said mica *o* may be omitted, if desirable so to do, in which case the wire-gauze *p* will of course be used in the combination and for the purposes aforesaid. Any suitable wire-gauze may be used alone or in combination with the said mica *o*, which may have any required number and size apertures *u* required.

In the operation of this stove there is a draft through the said wire-gauze in the said front door, and a draft through the apertures communicating with the said chamber *k*, and also a draft through the damper in the ash-chamber, drawn up through the fire-grate and also through the apertures which communicate between the said air-distributing chamber and the said fire-chamber or chamber of combustion.

*a a*, Figs. 1 and 2, is the outer cylinder, and may be of any size or shape desired. This cylinder forms the flues *h h*, Fig. 2, which are for the purpose of receiving heat from the fire-chamber and a downward draft produced by closing the damper *y* in the funnel A, which connects the chamber *t* to the tube or exit-pipe *j*. With said damper closed the draft will be from the chamber or ash-pit *g*, up through the fire-chamber, and through said air-distributing chamber, and through the apertures therein, as aforesaid, and in part against the plate *m*, along the surface of the same, and between the upper end of the same and the door *w*, over the top of the chamber *k*, thence down the said flues *h h*, Fig. 2. When at the bottom thereof, the currents unite and pass up the tube or exit-pipe *j*. When this damper *y* is open, then a direct draft is had, in which case a stronger fire is created. The air to supply combustion is admitted to the lower part of the said fire-chamber in the usual manner, and passes up through the fire-grate and at the sides of the fire, as aforesaid.

The coal in the fire chamber rests upon any fire-grate which will answer the purpose, and which grate is operated in any way or manner deemed best. *b b*, Figs. 1 and 2, is an inside cylinder, and is for the protection of the said outer cylinder, *a*, from undue heat from the fire-chamber within the said cylinder, which is made of sheet-iron.

The said air-distributing chamber *s* opens directly into the ash drawer chamber *g*, in any sufficient manner which will allow the air to enter said chamber at its bottom from the damper in the front or ash-drawer chamber *g*.

Having thus described the construction and operation of my said invention and improvements, what I claim, and desire to secure by Letters Patent, is—

1. The combination of the cylinder or box *c* with the surrounding air-distributing chamber *s* and with the fire-brick *d*, containing apertures, all constructed and arranged in the manner substantially as and for the purposes herein described and set forth.

2. The perforated plate *m* and cold-air chamber *k* in combination with the said door *w*, having therein the wire-gauze *p*, or its equivalent, and with the surrounding air-distributing chamber *s*, in the manner and for purposes herein described and set forth.

3. The perforated plate *m* and cold-air chamber *k*, or its equivalent, in combination with the door *w*, having therein the cold-air chamber *z*, constructed and arranged and combined in the manner and for the purposes substantially as herein described and set forth.

4. The employment of the air-distributing chamber *s*, opening at its lower end into the ash drawer or chamber *g*, and immediately between the fire-brick or inner linings, *d*, of the fire-chamber and the outer casing or box, *c*, surrounding the said air chamber, and having lugs or iron pins cast thereon, and each arranged and combined in the manner substantially as herein described and set forth.

In testimony whereof I have, on this 27th day of May, A. D. 1865, hereunto set my hand.

PHILO P. STEWART.

Witnesses:

MARCUS P. NORTON,
CHARLES D. KELLUM.